United States Patent Office 3,113,021
Patented Dec. 3, 1963

3,113,021
FILLER WIRE FOR SHIELDED ARC WELDING
Charles E. Witherell, Bound Brook, N.J., assignor to The International Nickel Company, Inc., New York, N.Y., a corporation of Delaware
No Drawing. Filed Feb. 13, 1961, Ser. No. 88,654
4 Claims. (Cl. 75—171)

The present invention relates to a consumable welding or filler wire for use in shielded arc-welding and, more particularly, to an improved nickel-chromium alloy welding wire having a special composition, which welding wire deposits ductile, sound overlayments, and is capable of joining similar and dissimilar metals at high speeds of welding even under great restraint and which produces welds that are essentially free of hot-cracking tendencies and porosity.

A long-standing need has existed in the art for a consumable welding wire for use in shielded arc-welding that will lay down a nickel-chromium alloy weld deposit and/or overlay that is substantially free from cracks and porosity while also possessing good arc characteristics. It is well known that such shielded arc-welding wires permit much greater welding speeds and, as a consequence thereof, are more economical than flux-coated wires for large scale welding operations. Although attempts were made to provide such a welding wire, none, as far as I am aware, was entirely successful when carried into practice commercially on an industrial scale.

It has now been discovered that ductile nickel-chromium welds and overlays, including iron-diluted welds and overlays, which are substantially free of cracks and porosity can be produced with a shielded bare welding wire even at high welding speeds and even under conditions of relatively severe restraint by employing a nickel-chromium alloy filler wire of unique composition.

It is an object of the present invention to provide an improved bare nickel-chromium alloy welding wire for use in shielded arc-welding which wire is especially suitable for the production of ductile, sound, nickel-chromium alloy welds or overlays that are free of hot-cracking even when appreciably diluted with iron.

Another object of the present invention is to provide a submerged arc nickel-chromium welding wire having a unique composition which weld wire is particularly useful in the high speed welding and/or overlaying of similar and dissimilar metals and/or alloys of iron and/or nickel.

It is also an object of the present invention to provide a bare nickel-chromium welding wire for use in gas-shielded arc-welding which is capable of effecting sound, crack-free welds and/or overlays even where the weld deposit is appreciably diluted with iron.

Other objects and advantages will become apparent from the following description:

Generally speaking, the present invention contemplates a consumable bare welding wire for use in shielded arc-welding, including inert gas-shielded arc-welding, submerged arc-welding, atomic hydrogen welding, etc., containing, by weight, from about 12% to about 25% chromium, up to about 20% iron, from about 2% to about 9.5 % manganese, up to about 3.5% columbium, the sum of the manganese content plus twice any columbium content being at least about 6% and advantageously at least about 7.5%, up to about 0.5% silicon, up to about 1% titanium, up to about 0.1% carbon and the balance essentially nickel. In addition, the nickel-chromium wire is advantageously substantially devoid of aluminum, magnesium, sulfur and copper, although up to about 0.1% aluminum, up to about 0.2% magnesium, up to about 0.02% sulfur and up to about 0.5% copper may be tolerated. The core wire may also contain a small amount of cobalt, e.g., up to about 2%, although advantageously the cobalt content does not exceed about 0.1%. The welds and overlays produced through the use of this wire provided in accordance with the present invention are substantially free of cracks and porosity, even when high speeds of welding are employed, e.g., 15 pounds of weld metal per hour or higher, and even when relatively large sections are involved and conditions of severe restraint are present. A small amount of tantalum is commonly associated with columbium in the forms in which columbium is commercially available. For example, columbium is available as an alloy nominally consisting of, by weight, 40% nickel and 60% columbium, but one-tenth of the nominal columbium content is often tantalum. The welding wires according to this invention can also contain such tantalum introduced into them with the columbium, and any such tantalum up to about ⅕ the columbium is deemed to be columbium for the purposes of this invention.

It is essential that all of the foregoing ingredients of the consumable wire composition be present in the amounts specified in order to provide a welding wire for use in shielded arc-welding suitable for producing ductile, non-age-hardenable weld deposits or overlays which are substantially free of hot-cracking and porosity. In addition, the unique combination of ingredients hereinbefore set forth provides a welding wire that has superior arcing characteristics. For example, the chromium should be present in amounts from about 12% to about 25% by weight of the wire to economically insure proper corrosion resistance to the weld deposit or overlay. In addition, in an overlay the chromium is a getter of carbides and their interaction, especially where large amounts of each are present, e.g., more than 25% chromium and more than 0.1% carbon, produces interfacial carbides which are quite brittle. The iron content should be limited to about 20% as increasing iron decreases the corrosion resistance of the weld deposits or overlays. The titanium should be less than 1% otherwise the weld deposits or overlays produced through the use of the welding wire will age-harden at the temperatures at which stress-relieving is usually conducted, e.g., about 1050° to about 1450° F. for various periods of time. The deleterious effects of age-hardening of the alloy are to increase the susceptibility to cracking and the loss of ductility and notch toughness. On the other hand, it is found that advantageously about 0.2% to about 0.5% titanium imparts some beneficial effects to the weld deposit or overlay. For example, small amounts of titanium assist in keeping the porosity of the weld deposit at a minimum.

Manganese should be present in amounts from about 2% to about 9.5% by weight of the wire. If too much manganese is present, i.e., more than 9.5%, the ingot from which the welding wire is to be drawn is only difficultly workable and hardly workable at all under ordinary conventional commercial operating procedures. A minimum manganese content of about 2% is very important otherwise the deposits from a welding wire containing less than 2% are extremely susceptible to hot-cracking. However, in order to substantially completely obviate the tendency of the weld deposits to hot-crack, it is essential that the manganese content plus twice the columbium content be at least about 6% and, advantageously at least about 7.5%. Thus, when the manganese content is 8%, for example, no columbium need be present in order to obtain crack-free welds. On the other hand, columbium alone, without at least about 2% manganese, does not inhibit hot-cracking. In addition, if more than about 3.5% columbium is present, especially in the presence of high chromium, e.g., approaching 25%, and high carbon, the weld deposits are brittle since columbium acts as a getter of carbon forming brittle carbides which through migration settle at the grain boundaries.

As was stated hereinbefore, the consumable bare welding wire of the present invention is for use in shielded metal arc-welding including inert gas-shielded arc-welding, submerged arc-welding, etc. Each of the aforementioned arc-welding techniques provide a metallurgically similar shielding, i.e., protection from oxidation, of the metal transfer across the arc. For example, in inert gas-shielded arc-welding, the metal transfer across the arc is protected by an inert gas. Advantageously, the inert gas used in the present invention is pure argon or pure helium and combinations thereof with or without small additions of hydrogen, e.g., up to about 10% by volume of the gas. However, mixtures of argon and/or helium with carbon dioxide or oxygen in amounts up to 10% by volume are also useable within the scope of the present invention. The use of argon and/or helium, with or without hydrogen, permits the production of good, clean beads that are substantially free of oxidation products. Hydrogen is beneficial to the inert gas when the inert gas is not of the highest purity as its inclusion aids in the production of weld deposits and/or overlays that are less porous and sounder than if it were not included. On the other hand, oxygen and/or carbon dioxide, although useable in combination with argon and/or helium, with or without hydrogen additions, cause spattering even when present in amounts as low as about 2%. The reason for this is the formation of reaction products and, when hydrogen is also present, the formation of water. In addition, if the oxygen and/or carbon dioxide volume content is not kept below about 10%, oxidic deposits that are quite porous are formed and/or intergranular oxidic films are formed which substantially weaken the weld metal.

The submerged arc-welding process provides a shield to the welding zone by a blanket of granular, fusible material known as the flux. According to this invention, any of the commercially available fluxes may be used that are chemically and metallurgically neutral, i.e., chemically they are neither acidic nor basic, and metallurgically they provide no alloying ingredients to the weld metal. In general, the fluxes can be any mineral materials which are substantially free from substances capable of evolving large amounts of gases during welding. Thus, an agglomerated flux may be readily employed with the welding wire of this invention. In addition, a fused and crushed flux having a glassy appearance may also be used advantageously. The agglomerated flux has the disadvantage of having a tendency to pick up water, while on the other hand, the fused and crushed flux has the disadvantage of being high in silica although it has greater resistance to water pick-up than the agglomerated. As a result thereof, the particular type of flux used depends on the particular job to be welded, e.g., procedure employed, type of joint and composition of the material to be welded.

In carrying the invention into practice, advantageous results are obtained when the welding wire contains about 18.5% to about 21.5% chromium, up to about 2% iron, from about 2.25% to about 2.75% columbium, from about 2.75% to about 3.25% manganese, less than about 0.3% silicon, from about 0.2% to about 0.5% titanium, up to about 0.08% carbon, less than about 0.08% aluminum and the balance essentially nickel.

For the purpose of giving those skilled in the art a better understanding of the invention and a better appreciation of the advantages of the invention, the following illustrative examples are given:

EXAMPLE I

In order to produce a welding wire, a 2" x 2" rod was forged from an alloy ingot and then hot-rolled to ¼" diameter. The ¼" diameter wire was then cold drawn to wire having a diameter of about 0.062 inch. The wire contained, by weight, about 20% chromium, about 1% iron, about 2.5% columbium, about 3% manganese, about 0.2% silicon, about 0.35% titanium, about 0.03% carbon and the balance nickel. The wire was wound upon a spool.

EXAMPLE II

To demonstrate the suitability of the welding wire of this invention a butt weld was made using the semi-automatic gas metal-arc process, manually operated, with pure argon at about 300 amperes and 28 volts, direct current reversed polarity and the welding wire of Example I to butt join two 1-inch thick x 5" x 10" nickel-chromium alloy plates under highly restrained conditions. The nickel-chromium alloy plates each contained about 76.5% nickel, about 15.7% chromium, about 7.1% iron, about 0.2% manganese, about 0.23% silicon and about .03% carbon. One 10" edge of each of the aforementioned nickel-chromium alloy plates was machined with a single U-groove joint preparation providing a 30° included angle between the butting edges of the plates which were positioned ³⁄₃₂ inch apart at the root. The plates were clamped during welding to a 6" thick steel platen using three sides, with only a single pass on the root side which was back-chipped into sound metal after completing the welding on the top side.

After welding, the joint was X-rayed using a 2% sensitivity penetrameter as defined in the Welding Handbook, 1957, volume 1, chapter 8.39, published by the American Welding Society, and no defects or porosity were observed. The butt joint was then cross-sectioned to provide six transverse slices, ⅜" thick for side-bend tests in accordance with the procedure outlined in the Welding Handbook, 1957, volume 1, chapter 9.9 to 9.12, published by the American Welding Society. The remaining portion of the weld was machined to provide a 0.505" diameter all-weld-metal tensile test specimen. The six transverse slices were polished on both sides using a fine-grained rubber-bonded abrasive wheel, after which the weld area was etched with Lepito's reagent, i.e., a mixture containing 250 grams of ferric chloride, 100 cubic centimeters of hydrochloric acid, 30 cubic centimeters of nitric acid, 15 grams of ammonium sulfate and 75 cubic centimeters of water, to outline the weld grain structure. The weld areas were then examined at a magnification of 30 diameters (30× magnification) for defects. No defects were observed in any of the twelve sides.

The six slices were then given a side-bend test bending the weld area of each slice about one of its sides over a cylindrical solid steel pin 1½" in diameter until the sides of the resulting U-bend were parallel. The bent surfaces of each specimen were then examined. Despite the severity of the tests three of the six specimens were completely free of defects; one of the six had only two defects ¹⁄₃₂" long; the other two specimens contained but a single defect, each only ¹⁄₆₄" long.

The all-weld-metal tensile specimen was tested at room temperature. The ultimate tensile strength was 96,200 pounds per square inch (p.s.i.); the yield strength at 0.2 percent offset was 57,100 p.s.i.; and the elongation in a 2" gage length was 45 percent with an accompanying reduction in area of 56 percent. These results indicate a joint efficiency of 100 percent, since the hot rolled and annealed nickel-chromium alloy plate having the composition as set forth hereinbefore has an ultimate tensile strength at room temperature of 90,500 p.s.i. and a 0.2 percent offset yield strength of 36,500 p.s.i.

EXAMPLE III

A butt joint, similar to that described in Example II, using a welding wire of the same composition and in the same manner, but between a nickel-chromium plate having the composition set forth in Example II and a carbon steel plate was made to demonstrate the versatility of the welding wire of this invention in joining a ferrous metal to a nickel-chromium alloy. The carbon steel contained about 0.2% carbon, about 0.38% manganese with the balance essentially iron. One-inch thick plates 5" x 10" were used for this joint. The joint design and welding procedure were the same as described in Example II. After welding, the joint was stress-relieved at 1200° F. for 1½ hours and sectioned to provide 6 side-bend test specimens and an all-weld-metal tensile specimen, as had been done with the previously described joint. X-ray tests at 2 percent sensitivity showed no defects or porosity.

The six side-bend specimens before testing were examined at 30× magnification after polishing and then etching the faces with Lepito's reagent, and no defects were observed in any of the twelve sides. After severe side-bend tests, examination revealed that 5 of the 6 specimens were still completely free of defects and only one specimen contained one defect about 1/64" long which is more than satisfactory under these severe test conditions.

The ultimate tensile strength of the all-weld-metal specimen machined from this weld was 94,500 p.s.i.; the yield strength at 0.2 percent offset was 57,000 p.s.i.; and the elongation in 2 inches was 45% with a reduction in area of 52%. The results from this weld also indicate a joint efficiency of 100 percent.

EXAMPLE IV

To demonstrate the capability of the welding wire of this invention to deposit sound nickel-chromium overlays on heavy sections of carbon steel such as are encountered in tube sheet applications, a 4" thick block x 5" wide x 10" long of A–212 pressure vessel steel containing, by weight, about 0.26% carbon, about 0.86% manganese, about 0.33% silicon with the balance essentially iron, except for the usual impurities, was overlayed with four layers of weld metal from a nickel-chromium welding wire having the dimensions and composition as set forth in Example I. The weld metal was deposited using the gas metal-arc process automatically operated. The welding head was mechanically oscillated laterally to provide a bead width of about 1 inch. Welding travel speed was adjusted to produce beads about ⅛" thick running in the 10" direction of the steel block. As in Example II, pure argon was employed as shielding gas, but the overlay was made at about 280 amperes and about 27 volts, direct current reversed polarity.

After overlaying, the block was stress-relieved for 8 hours at 1200° F. The overlay was then removed from the major portion of the 4" thick block by making a saw cut on a plane parallel to the surface of the overlay and about ¾" below the junction of the steel and overlay deposit. The resulting overlay slab was then cut into ⅜" wide slices cut transversely to the direction of welding. Seventeen such specimens were obtained. These were then polished on both sides, etched with Lepito's reagent, and examined at 30× magnification for evidence of cracking or other defects. The examination of the faces of all 17 specimens indicated absolutely no defects whatsoever. The specimens were then given side-bend tests through 180° and re-examined. Again, no defects or cracks were observed in any of the 17 specimens after side-bend testing.

EXAMPLE V

A welding wire containing about 19.5% chromium, about 0.9% iron, about 2.9% columbium, about 0.2% silicon, about 2.7% manganese, about 0.4% titanium, about 0.02% carbon balance nickel was used to deposit an overlay on a 4" thick block of A–212 pressure vessel steel having the composition set forth in Example IV. It was quantitatively determined that the deposited overlay taken no closer than 3/16" from the fusion line of the steel and overlay contained, by weight, about 17.8% chromium, about 6.3% iron, about 2.5% columbium, about 0.25% silicon, about 2.5% manganese, about 0.3% titanium, about 0.02% carbon and about 70% nickel. The arc-welding technique employed was the same as that employed in Example IV with substantially pure argon as the shielding gas. To demonstrate the freedom from hardening response during stress relief of the weld metal, hardness impressions were taken across the dimension of the overlay in the as-welded and in the stress-relieved conditions. The stress-relieving of the overlay was at about 1200° F. for about 9 hours. The results of these tests are reported in the following Table I:

Table I

| Location of Hardness Impressions | Hardness (Rockwell B) Condition of Overlay | |
|---|---|---|
| | As Welded | Stress Relieved |
| 1/16" Below Overlay Surface | 87 | 90 |
| ⅛" Below Overlay Surface | 88 | 90 |
| 3/16" Below Overlay Surface | 88 | 89 |
| ¼" Below Overlay Surface | 89 | 90 |
| 5/16" Below Overlay Surface | 88 | 90 |
| Near Overlay Surface | 88 | 87 |
| 1/16" Below Interface (In Steel) | 87 | 80 |
| ⅛" Below Interface (In Steel) | 87 | 79 |

These results demonstrate that there was very little or no age-hardening response after stress-relieving at about 1200° F. for about 9 hours. Thus, overlays and weld deposits produced from the filler wire of the present invention have no loss of ductility and have little if any susceptibility to hot-cracking.

EXAMPLE VI

In order to demonstrate the suitability of the present invention in submerged arc-welding, a welding wire was produced in the same manner as in Example I except that the wire was cold drawn down to a welding wire having a diameter of 5/32". The wire so produced was of the same composition as the wire composition of Example I.

EXAMPLE VII

Two nickel-chromium plates having the composition as set forth in Example II, and being 1" thick x 5" wide x 10" long were joined by a butt weld in the following manner. One 10" edge of each plate was machined to provide a standard double-V groove configuration with a groove angle of 90°, a ½ inch root face and no root spacing. The joint was tacked together and clamped to a 2" thick steel welding table. The joint was then welded with a wire having the dimensions and composition as shown in Example VI. The flux used in the submerged arc process was a commercially available agglomerated, metallurgically and chemically neutral flux. The first, or backing, pass was deposited at 500 amperes and 50 volts direct current reversed polarity. The finishing pass was deposited from the opposite side of the joint at 600 amperes and 50 volts direct current reversed polarity. Travel speed was 10" per minute. The wire was fed to the joint in a direction perpendicular to the plate in both planes. The welding head was not oscillated and no preheat or control of interpass temperature was maintained.

After welding, the butt joint was cross-sectioned to provide five transverse slices, each one ⅜" thick, for side-bend tests. The five slices were polished on both faces using a fine-grained rubber-bonded abrasive wheel, after which the weld area was etched with Lepito's reagent to outline the grain structure. The weld areas were then examined at 30× magnification for defects. No defects were observed in any of the ten sides.

The five slices were then subjected to a side-bend test, bending the weld area over a cylindrical solid steel pin 1½" in diameter (pin radius=2×thickness of specimen). The test was continued until the sides of each of the specimens were bent about 180°. The bent surfaces each specimen were then examined. No defects were observed in any of the five slices after bending.

EXAMPLE VIII

To demonstrate the capability of the nickel-chromium welding wire of the present invention to deposit sound nickel-chromium alloy overlays on carbon steel using a submerged-arc process, a 4″ thick carbon steel plate 6″ wide x 12″ long and having a composition as set forth in Example III was overlayed with one layer of metal from a welding wire having the dimension and composition as set forth in Example VI. The flux used in the submerged-arc process was a commercially available, chemically and metallurgically neutral flux of the fused and crushed type. A single arc type submerged-arc welding unit was used for the overlaying. In the plane parallel to the welding direction, the wire was fed to the weld pool at an angle of 20° from vertical and inclined in the direction of welding. In the plane transverse to the welding direction, the wire was perpendicular to the plate. The welding head was oscillated through an angle of 10° at a frequency of about 60 cycles per minute. The 10° angle displaced the wire about ¼″ at the weld pool. No preheat was used and interpass temperature of the plate was maintained at less than about 400° F. Travel speed was 12″ per minute, and the welding current was about 560 amperes at about 28 volts, direct current reversed polarity.

After overlaying, five ⅜″ wide transverse slices were cut from the overlayed plate and given a side-bend test as described in Example VII for the butt weld. The slices were then polished on both sides, etched and examined at 30× magnification for defects. No defects whatsoever were observed in any of the ten sides. The five specimens were then given side-bend tests through 180° and re-examined in accordance with the procedure set forth in Example VII. No defects or cracks were observed in any of the five specimens after side-bend testing.

The present invention is applicable to the rapid welding and overlaying of nickel alloys and iron alloys containing up to 100% nickel, up to 100% iron, up to 35% chromium, up to 35% copper, up to 0.25% carbon and up to 40% cobalt even under conditions of severe restraint. For example, the present invention is particularly suited to the welding of nickel-chromium alloys to themselves; for joining these alloys to steel including alloy steels and for overlaying such materials on nickel-chromium alloys or on steel; for welding the clad side of nickel-chromium alloy clad steels and for joining nickel-chromium alloys, mild steel, AISI 200, 300, 400 and 500 steels to each other or to themselves with freedom from such detrimental characteristics as porosity and hot-cracking even when dilution of the weld with iron is encountered. The high level of weld quality made possible through the electrode of this invention permits the use of arc-welding techniques in even the most critical applications where assurance of top quality is of the utmost importance. Furthermore, the present invention is also applicable for use as a consumable insert ring, i.e., usually a circular ring for root-pass welding that fits into the joint to be welded (especially pipes and tubes) which is fused into the joint.

It is to be noted that the present invention is not to be confused with flux-coated electrodes wherein the transfer of metal across the arc is protected by the ingredients of the flux which may also contribute alloying ingredients to the weld deposit. The flux-coated electrode suffers from the disadvantage of not being adaptable to high-speed welding and thus is uneconomical in large scale welding operations. In addition, metal transfer across the arc in flux-coated electrodes is not as efficient as in the shielded arc-welding process with a bare wire. Thus, the metallurgical and chemical considerations are different between the shielded bare wire and the flux-coated electrode.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

I claim:

1. A welding material consisting of a consumable wire for use in shielded arc-welding containing, by weight, about 20% chromium, about 1% iron, about 2.5% columbium, about 3% manganese, about 0.2% silicon, about 0.35% titanium, about 0.03% carbon and the balance essentially nickel.

2. A welding material consisting of a consumable wire for use in shielded arc-welding containing, by weight, from about 18.5% to about 21.5% chromium, up to about 2% iron, from about 2.75% to about 3.25% manganese, from about 2.25% to about 2.75% columbium, up to about 0.3% silicon, from about 0.2% to about 0.5% titanium, up to about 0.08% carbon and the balance essentially nickel.

3. A welding material consisting of a consumable wire for use in shielded arc-welding containing, by weight, from about 12% to about 25% chromium, up to about 20% iron, from about 2% to about 9.5% manganese, up to about 3.5% columbium, the sum of the manganese content plus twice any columbium content being at least about 6%, up to about 0.5% silicon, titanium in small amounts up to about 1% to minimize weld porosity, up to about 0.1% carbon and the balance essentially nickel.

4. The welding material of claim 3 wherein the content of manganese and columbium is such that the sum of the manganese content plus twice any columbium content is at least 7.5%, and wherein the titanium content is about 0.2% to about 0.5%.

References Cited in the file of this patent

UNITED STATES PATENTS

| | | |
|---|---|---|
| 901,428 | Dempster | Oct. 20, 1908 |
| 2,266,318 | Heller | Dec. 16, 1941 |
| 2,422,489 | Kihlgren et al. | June 17, 1947 |
| 2,445,951 | Kihlgren et al. | July 27, 1948 |
| 2,587,275 | Bash | Feb. 26, 1952 |
| 3,024,137 | Witherell | Mar. 6, 1962 |

OTHER REFERENCES

Metals Handbook, 1948 edition, published by the American Society for Metals, Novelty, Ohio (pp. 478, 1027 relied upon).

"Gases In Metals," by Smith, D. P., Eastwood, L. W., Carney, D. J., Sims, C. E.; copyright 1953 by the American Society for Metals, Novelty, Ohio (pp. 50–55 relied on).